US008038916B2

(12) United States Patent
Nakamura

(10) Patent No.: US 8,038,916 B2
(45) Date of Patent: Oct. 18, 2011

(54) SOLID-LIQUID SEPARATING METHOD, SOLID-LIQUID SEPARATOR AND SOLIDIFIED PRODUCT

(75) Inventor: Kanji Nakamura, Kuwana (JP)

(73) Assignee: NTN Corporation, Osaka (JP)

( * ) Notice: Subject to any disclaimer, the term of this patent is extended or adjusted under 35 U.S.C. 154(b) by 671 days.

(21) Appl. No.: 11/493,098

(22) Filed: Jul. 26, 2006

(65) Prior Publication Data

US 2007/0023949 A1  Feb. 1, 2007

(30) Foreign Application Priority Data

Jul. 27, 2005 (JP) ................................ 2005-216798
Jul. 27, 2005 (JP) ................................ 2005-216799
Jul. 27, 2005 (JP) ................................ 2005-216801
Jul. 27, 2005 (JP) ................................ 2005-216802

(51) Int. Cl.
*B01D 29/00* (2006.01)
(52) U.S. Cl. ........................ 264/109; 210/770
(58) Field of Classification Search ................ 264/109, 264/120, 86; 210/767, 780, 359, 398, 413, 210/414, 416.1, 808, 770, 224, 227, 231, 210/324, 330, 354, 356, 350, 806, 225, 805; 100/37, 101, 110, 198, 116, 126–129, 214–216, 100/226, 41, 106, 125, 238; 425/84; 162/382
See application file for complete search history.

(56) References Cited

U.S. PATENT DOCUMENTS

| 4,587,022 A | * | 5/1986 | Shimizu et al. ............... 210/710 |
| 5,290,445 A | * | 3/1994 | Buttery ......................... 210/445 |
| 6,874,411 B2 | | 4/2005 | Nakamura et al. |
| 2001/0050006 A1 | | 12/2001 | Nakamura et al. |
| 2006/0032380 A1 | * | 2/2006 | Klaassen ........................ 99/295 |

FOREIGN PATENT DOCUMENTS

| JP | 05293737 A | 11/1993 |
| JP | 08010526 A | 1/1996 |

(Continued)

OTHER PUBLICATIONS

Dictionary.com [online], [retrieved on Sep. 29, 2009], Retrieved from http://dictionary.reference.com/browse/seal, definition No. 22.*

(Continued)

*Primary Examiner* — Matthew Daniels
*Assistant Examiner* — Yana Belyaev
(74) *Attorney, Agent, or Firm* — Osha • Liang LLP

(57) ABSTRACT

To provide a reliable solid-liquid separating method and apparatus for a slurry, even though the solid component of the slurry is finely divided particles and/or of a shape difficult to entangle, without exudation through gaps in processed portions and, also, with no need to exercise a maintenance work such as replacement of filters, a solid-liquid separating apparatus includes a mold having a cylindrical inner peripheral surface, a gate for opening and closing a second open end of the mold, and a pressing rod slidable into the mold to compress the slurry. Sheet-like fibrous filters are placed on a leading end face of the pressing rod and an inner surface of the gate to seal gaps between the mold and the pressing rod and between the gate and mold. With the filters so placed, the slurry within the mold unit is compressed to provide a solidified product, thereby accomplishing solid-liquid separation.

3 Claims, 6 Drawing Sheets

FOREIGN PATENT DOCUMENTS

| | | | | |
|---|---|---|---|---|
| JP | 2001300597 | A | * | 10/2001 |
| JP | 2001300784 | A | | 10/2001 |
| JP | 2002126790 | A | | 5/2002 |
| JP | 2002126792 | A | | 5/2002 |
| JP | 2002137095 | A | | 5/2002 |
| JP | 2003033897 | A | | 2/2003 |
| JP | 2004337972 | A | | 12/2004 |
| NL | 1020775 | | * | 11/2003 |

OTHER PUBLICATIONS

"Sheet" definition [online], [retrieved on Jul. 29, 2010], retrieved from PAJ Database (http://wordnetweb.princeton.edu/perl/webwn?s=sheet).*

JP 2001-300597 (Machine Translation) [online], [retrieved on Dec. 17, 2010], retrieved from PAJ Database (http://www19.ipdl.inpit.go.jp/PA1/cgi-bin/PA1INDEX).*

Office Action in Japanese Application No.: 2005-216798, Dated Aug. 9, 2011 (6 pages with English Translation).

Office Action in Japanese Application No. 2005-216799, Dated Aug. 9, 2011 (4 pages with English Translation).

English Patent Abstract of JP 2004-337972, Publication Dec. 2, 2004 (1 page).

English Patent Abstract of JP 08-010526, Publication Jan. 16, 1996 (1 page).

English Patent Abstract of JP 05-293737, Publication Nov. 9, 1993 (1 page).

English Patent Abstract of JP 2002-126790, Publication May 8, 2002 (1 page).

English Patent Abstract of JP 2001-300784, Publication Oct. 30, 2001 (1 page).

English Patent Abstract of JP 2002-137095, Publication May 14, 2002 (1 page).

English Patent Abstract of JP 2003-033897, Publication Feb. 4, 2003 (1 page).

English Patent Abstract of JP 2002-126792, Publication May 8, 2002 (1 page).

* cited by examiner

PRIOR ART

SOLID-LIQUID SEPARATING METHOD, SOLID-LIQUID SEPARATOR AND SOLIDIFIED PRODUCT

BACKGROUND OF THE INVENTION

1. Field of the Invention

The present invention relates to a solid-liquid separating method for separating a slurry of a kind containing a mixture, of a liquid processing agent and solid particulate wastes, produced during a machining of metals, or of a kind produced during the wood working, into a solid component and a liquid component, and for solidifying the solid component to provide a compressed solidified product. The present invention also relates to an apparatus for performing the solid-liquid separation referred to above and to the compressed solidified product so obtained from the solid-liquid separation and the subsequent compressing of the solid component.

2. Description of the Prior Art

As is well known to those skilled in the art, during the practice of the various grinding processes such as, for example, honing, super processing and lapping, pulverized particles such as finely ground wastes are produced. Such pulverized particles are generally mixed with a processing liquid such as, for example, a liquid coolant to form a slurry or sludge, which is discharged out of the processing machine. The sludge so discharged is, in most cases, subjected to a solid-liquid separation with a filtering apparatus or a low pressure filter press so that the processing liquid separated from the pulverized particles can be recovered for reuse.

The solid-liquid separating method utilizing the filter or the low pressure filter press has been recognized to generate a processed sludge still having high content of liquid, resulting in such problems that not only can a sufficient amount of the processing liquid be recovered, but the sludge concentrated as a result of the solid-liquid separation cannot be recycled and is generally disposed of in land reclamation.

In order to alleviate the foregoing problems, the Japanese Laid-open Patent Publication No. 2001-300597, published Oct. 30, 2001, for example, discloses formation of a solid briquette of the ground sludge. Specifically, this published patent document discloses, as shown schematically in FIG. 11 of the accompanying drawings, supplying the concentrated sludge S' into a cylindrical mold unit 51 and subsequently compressing the concentrated sludge S' with a pressing rod 53 to provide a solid briquette. During the squeezing, one of opposite open ends of the mold 51 remote from the pressing rod 53 inserted into the mold unit 51 is closed by a gate 52, which is moved to an open position when the resultant solid briquette is to be discharged out of the mold unit 51. The sludge solidifying apparatus so discloses is currently utilized in practice.

The sludge solidifying apparatus including the cylindrical mold unit 51 and the pressing rod 53 such as disclosed in the above mentioned published patent document can work satisfactorily with the ground sludge made up of thread-like ground wastes that are relatively easy to entangle. However, such known sludge solidifying apparatus cannot work sufficiently with such sludge as sludge produced during honing, sludge produced during super-processing, sludge produced during lapping, and sludge produced during grinding of rolling elements such as, for example, bearing rollers and steel balls, because of the following reason.

Particulate wastes produced during those processes referred to above are finely divided and are so generally rounded as to render them to be difficult to entangle and, therefore, during the compression, some of them tend to flow out together with a liquid component through mechanical gaps δ1 and δ2 delimited between the mold unit 51 and the pressing rod 53 and between the mold unit 51 and the gate 52. In other words, while the standard ground wastes are so relatively large in particle size or represent such a thread-like shape as to render them to be easy to entangle, solidification of those standard ground wastes is easy to achieve without appreciably flowing out through the mechanical gaps δ1 and δ2 of the equipment, the sludge produced during the honing process contain the ground wastes so generally rounded as to render them to be difficult to entangle and, on the other hand, the sludge produced during the super processing and the lapping process are very finely divided. The sludge produced during the grinding of bearing rolling elements also contain finely divided ground wastes. For this reason, the conventional sludge solidifying apparatus referred to above cannot be satisfactorily used for solidifying or briquetting those sludge.

Not only does the flow of the ground wastes outwardly of the mold unit 51 through the mechanical gaps δ1 and δ2 discussed above render solidification or briquetting to be difficult to achieve, but the eventually recovered liquid component is still mixed with some of the ground wastes and, therefore, the processing liquid recovered cannot be reused satisfactorily, requiring the recovered processing liquid to be filtered even after the recovery thereof.

When it comes to the use of the ground sludge solidifying apparatus for solidifying or briquetting ground wastes such as produced during the honing process, an attempt is made to use a metallic filter held at a fixed position to thereby minimize or substantially avoid the undesirable flow of some of the ground waste outwardly through the mechanical gaps in the processing machine. However, it has been found that once the metallic filter is clogged, filtering no longer occurs and the metallic filter must be regularly replaced with a fresh one, requiring a complicated and time-consuming maintenance work.

As a method of treating the sludge other than that produced during the honing process, methods are known, in which a low pressure filter press and a sedimentation apparatus are used respectively. In the practice of the method using the low pressure filter press, a generally belt-shaped filter is used, through which the sludge is passed across the filter by the aid of a compressed air supplied into a sealed chamber.

However, both of those methods are incapable of reducing the liquid content of the sludge sufficiently. Specifically, the use of the sedimentation apparatus can barely reduce the liquid content down to about 50 to 80%. For these reasons, the efficiency of recovery of the processing liquid is so insufficient as to result in incapability of recycling the remaining concentrated sludge.

SUMMARY OF THE INVENTION

In view of the foregoing problems and inconveniences hitherto encountered with, the present invention has for its essential object to provide a solid-liquid separating method, which is effective to accomplish a reliable solid-liquid separation of a slurry, even though the solid component of the slurry is finely divided to particulate matters and/or of a shape generally difficult to entangle, without allowing exudation to take place through gaps present in the processing machine, with no need to exercise a complicated and time-consuming maintenance work such as, for example, replacement of filters and, also without resulting in undesired break of the filters during a pressurizing process.

Another important object of the present invention is to provide a solid-liquid separating apparatus of a type effective to exercise the solid-liquid separating method referred to above.

A further important object of the present invention is to provide a compressed solidified product, which is made by the use of the solid-liquid separating method and/or the solid-liquid separating apparatus of the kind referred to above.

In order to accomplish these objects of the present invention, one aspect of the present invention provides a solid-liquid separating method for separating a slurry into a solid component and a liquid component, which is accomplished by utilization of a solid-liquid separating apparatus including a mold unit having a cylindrical mold cavity defined therein for accommodating the slurry and also having first and second open ends opposite to each other, a gate for selectively opening and closing the second open end of the mold unit and a pressing rod slidable into the cavity of the mold unit to urge the slurry against the gate, then held in position to close the second open end of the mold unit, to thereby compress the slurry. The solid-liquid separating method includes placing fibrous solid-liquid separating filters in the mold unit so as to seal a gap, delimited between an inner peripheral surface of the mold unit and an outer periphery of a leading end of the pressing rod, and another gap delimited between respective contact surfaces of the gate and the mold unit, respectively; driving the pressing rod into the mold cavity to compress the slurry within the mold unit; and ejecting a resultant solid component out of the mold unit together with the solid-liquid separating filters.

The gate referred to above may be of a type capable of selectively advancing into and retracting from the mold unit in a manner similar to the pressing rod, but in a sense opposite to the pressing rod. The sequence of placement of the filters on respective sides of the slurry and supply of the slurry into the mold unit may be suitably selected in consideration of the structure of one or both of the mold unit and the gate. It is specifically to be noted that the term "slurry" used hereinabove and hereinafter means a matter containing finely pulverized solid matters and liquid mixed together and is intended to encompass sludge.

According to the solid-liquid separating method of the kind described above, since while the filters are arranged at a leading end face of the pressing rod and an inner surface of the gate, the slurry within the mold unit is squeezed and compressed, those filters are effective to avoid flow of a portion of the solid component outwardly from the mold unit through gaps present between the mold unit and the pressing rod and between the mold unit and the gate even though the solid component contained in the slurry contains finely divided, difficult-to-entangle solid particles. Also, since the cylindrical mold unit and the cylindrical pressing rod are employed in cooperative relation to each other, the slurry filled in the mold unit can be compressed with a strong force. Accordingly, the liquid component contained in the slurry can be highly efficiently squeezed out from the slurry to such an extent that a compressed solid block after the solid-liquid separation may have a liquid component equal to or lower than 10 wt % relative to the total weight of the slurry charged into the mold unit.

As described above, with the solid-liquid separating method of the present invention, a high degree solid-liquid separation can be accomplished and, therefore, the compressed solidified product after the solid-liquid separation is easy to handle. Also, the rate of recovery of the liquid component contained in the slurry can be increased to such an extent as to render the resultant compressed solidified product to be economically recycled, thereby lessening the impact on the natural environment.

The filters referred to above are ejected out of the mold unit together with the resultant compressed solid block formed within the mold unit as a result of the compressing. Accordingly, for each cycle of operation of the solid-liquid separating apparatus, new filters of the same kind are used and, therefore, a stabilized filtration is possible. No regular filter replacement of a kind required solely because of clogging is required and, hence, not only can a complicated and time-consuming maintenance work be alleviated, but the working conditions can improve. Also, since the filters are discharged out of the mold unit together with the compressed solid block each time the compressing process completes, mere placement of the filters within the mold unit is sufficient and no complicated work to secure filters within the mold unit is required and mounting of the filters within the mold unit can easily be accomplished.

Although the filters, when the resultant compressed solidified product is ejected out of the mold unit, remain sticking to the compressed solidified product, if material for each of the filters is properly selected, no problem associated with ingress of foreign material will arise and the compressed solidified product so formed with the filters sticking thereto can be reused as a material for steel making. Although the filters are required to be replaced with new ones for each cycle of compressing operation, disposal of the used filters would not pose any problem associated with cost and environmental pollution, if considered from the standpoint of an accomplishment of reusing solid components of the sludge which have been difficult to reuse, an increase of the rate of recovery of the liquid component and the alleviation of the necessity of filtering the processing liquid.

Each of the filters may be in the form of a sheet such as, for example, a paper filter. If the filters are used in the form of the sheet-like filters, handling of those filters is easy.

In a preferred embodiment of the solid-liquid separating method of the present invention, the compressed solid component resulting from the squeezing of the slurry may be solidified within the mold unit and a solidified block of the solid component may then be ejected out of the mold unit together with the filters then sticking thereto.

Depending on the material constituting the slurry, there is a kind of slurry that is difficult to be solidified. In the case of such kind of slurry, the slurry may not necessarily be solidified and may be reused in the form of a compressed solidified product when the liquid content thereof is sufficiently reduced. However, solidification of the slurry is effective to enhance the handling capability in anticipation of the reuse. In such case, the filters stick to the compressed solid block as a result of the compressing and may be left as sticking thereto. By so doing, there is no need to separately dispose of the used filters, thus increasing the workability. When the filters made of a properly selected material are used as described above, they do not hamper the reuse of the compressed solidified product and the compressed solidified product having the filters sticking thereto can be charged into the furnace.

In another preferred embodiment of the solid-liquid separating method of the present invention, the solid component of the slurry may contain metallic particles as a principal component thereof. The metallic particles may contain iron as a principal component or a metallic material which has been hardened. The liquid component contained in the slurry may be an oil or water.

The slurry containing the solid component consisting of metal as a principal component is available in the form of, for example, a sludge produced during the honing of mechanical component parts, that produced during the super processing, that produced during the lapping and that produced during the grinding of rolling elements such as, for example, bearing rollers and steel balls. Where the solid component of the slurry is metal, the resultant compressed solidified product can be reused in the furnace as a material for steel making.

The present invention in accordance with another aspect thereof provides a solid-liquid separating apparatus for separating a slurry into a solid component and a liquid component. This apparatus includes a mold unit having a cylindrical mold cavity defined therein for accommodating the slurry and also having first and second open ends opposite to each other; a gate for selectively opening and closing the second open end of the mold unit; and a pressing rod slidable into the cavity of the mold unit to urge the slurry against the gate, then held in position to close the second open end of the mold unit, to thereby compress the slurry. In this apparatus, while fibrous solid-liquid separating filters are placed in the mold unit so as to seal a gap, delimited between an inner peripheral surface of the mold unit and an outer periphery of a leading end of the pressing rod, and another gap delimited between respective contact surfaces of the gate and the mold cavity, respectively, the pressing rod is driven into the mold cavity to squeeze the slurry within the mold unit. The resultant solid component is ejected out of the mold unit together with the solid-liquid separating filters.

According to the solid-liquid separating apparatus of the kind described above, the solid-liquid separating method described hereinbefore can be employed and, therefore, various effects similar to those afforded by the solid-liquid separating method can be obtained, which include the capability of assuredly achieving the solid-liquid separation without allowing a portion of the slurry to leak outwardly from the gaps in the processing machine even though the particles of the slurry are of a shape difficult to entangle and the unnecessariness of the complicated and time-consuming maintenance work such as replacement of the filters.

In a preferred embodiment of the solid-liquid separating apparatus of the present invention, the compressed solid component resulting from the compressing of the slurry may be solidified within the mold unit and a solidified block of the solid component may then be ejected out of the mold unit together with the filters sticking thereto.

In another preferred embodiment of the solid-liquid separating apparatus of the present invention, the solid-liquid separating apparatus may also include a pressing machine for selectively advancing and retracting the pressing rod and a pressure control device for controlling the pressing machine. The pressure control device referred to is operable to perform a pressure control in a manner required to render a pressure acting on the pressing rod to be within a predetermined range.

In the apparatus including the pressing machine and the pressure control device, since while the filters are disposed on respective sides of the pressing rod and the gate, the slurry within the mold unit is compressed, an undesirable leak of the solid component outwardly of the mold unit through the gaps present between the mold unit and the pressing rod and between the mold unit and the gate can be prevented by those filters even though the solid component of the slurry is finely divided particles and particles difficult to entangle. Also, since the cylindrical mold unit and the cylindrical pressing rod are used, the slurry filled within the mold unit can be compressed with a strong force.

Although fiber filters are used during the squeezing, an accidental breakage of one or both of those filters is effectively prevented. This is because the pressure control device performs a pressure control in such a manner that the pressure acting on the slurry within the mold unit may attain a value equal to or lower than a predetermined pressure to thereby squeeze the slurry under a properly controlled pressure effective to avoid the undesirable breakage of the filters. Because of this, the liquid component can be highly efficiently squeezed out from the slurry, for example, to such an extent as to result in the eventually compressed solid block having, after the solid-liquid separation, the liquid component equal to or lower than 10 wt % relative to the total weight of the slurry in the mold unit.

Since the high degree solid-liquid separation can be achieved as discussed above, the compressed solidified product after the solid-liquid separation is easy to handle and, also, the rate of recovery of the liquid component contained in the slurry can be increased to such an extent as to render the resultant compressed solidified product to be economically recycled, thereby lessening the natural environment load. Considering that in the case of the sheet-like filters used, those filters are susceptible to breakage, the pressure control according to the present invention brings about a remarkable advantageous effect of preventing the filter breakage.

Preferably, the pressing machine may include a servo motor and a rotary-linear motion translating mechanism for converting a rotary motion of the servo motor into a linear motion assumed by the pressing rod. In this case, the pressure control device performs as the pressure control, a torque control to cause a torque to attain a value equal to or smaller than a predetermined torque.

The use of the servo motor is advantageous in that it can easily be controlled as compared with the use of a hydraulic pressure and that an optimum solid-liquid separation can be achieved with, for example, the torque control. In the case of the torque control, as a detector used for the feedback control, a detector capable of detecting the torque loaded on the servo motor can be employed and, as compared with the use of a detector for directly detecting the pressure, the detector may be of a simple type. Also, no maintenance work such as replacement of a working oil for the hydraulic circuit and replacement of filters is required. In addition, compared to a pump system, an energy saving can be achieved and the noise level is low, thereby improving the working conditions.

The pressure control device referred to above is preferably of a type capable of controlling the pressing machine to undergo a quick advance mode, during which the pressing rod is advanced with its leading end approaching the slurry within the mold unit; a press advance mode, during which solid-liquid separation based on the squeezing is carried out; a press retention mode, during which a pressing force delivered by the pressing rod is retained; and a quick retraction mode, during which the pressing rod is retracted out of the mold unit, leaving the compressed solid block within the mold unit. In this case, during the press advance mode, the pressure control is performed to avoid a load torque from exceeding a preset value and, at the same time, to perform a speed control to avoid a speed from exceeding a preset value and, during the press retention mode, the torque control is performed to retain the preset load torque for a preset length of time.

When an abrupt increase of the load torque is detected during the quick advance mode, a quick advance movement appropriate to the quantity of the slurry charged into the mold unit can take place, minimizing a waste of time. During the press advance mode, a control can be made to exert a pressure sufficient to avoid an undesirable breakage of one or both of the filters through the torque control, and the addition of the speed control makes it possible to allow the pressing rod to perform the compression under a pressure and advance speed, both of which are optimum enough to avoid the breakage of the filters. When it comes to the squeezing of the liquid component, a time delay tends to occur relative to the pressing and, therefore, the liquid component tends to leak gradually, but the use of the pressure retention mode is effective to allow the liquid component to be highly efficiently squeezed out to such an extent as to reduce the liquid content of the eventually compressed solid block, thereby increasing the rate of recovery of the liquid component.

The solid-liquid separating apparatus referred to above may furthermore include a mold repositioning device capable of moving the mold unit along a predetermined path and repositioning the mold unit at a plurality of indexed positions; an lower filter mounting device positioned at one of the indexed positions, defined by the mold repositioning device, for placing a lower solid-liquid separating fibrous filter in a bottom region of the mold cavity of the mold unit; a slurry supplying device for supplying, at another one of the indexed positions, the slurry into the mold unit having the lower filter placed in it; a upper filter mounting device provided concurrently with or separately from the lower filter mounting device for placing an upper solid-liquid separating filter on a top surface level of the slurry supplied into the mold unit; and a pressing machine disposed at a further one of the indexed positions for inserting the pressing rod into the mold unit to compress the slurry.

The use of the filter mounting device referred to above results in increase of the number of the process steps of the solid-liquid separating method, i.e., requires an addition of the filter placement. However, since as described above, various process steps including the filter placement, the slurry supply and the slurry compression are sequentially performed at the respective indexed positions to which the mold unit is successively moved, unlike the case in which those process steps are performed while the mold unit is fixed in position, no problem associated with interference among those process steps occur and the respective devices capable of performing those process steps, i.e., the filter placement, the slurry supply and the slurry compression can advantageously be simplified in structure. Also, since the mold unit is made movable, preparation for the filter placement can be performed in advance while the compression is taking place at the different indexed position, a process ranging from the filter placement to the discharge of the resultant compressed solid block through the slurry supply and then through the slurry compression can be performed efficiently, resulting in increase of the productivity.

In another preferred embodiment of the solid-liquid separating apparatus of the present invention, the apparatus may yet include a traversing carriage, on which the mold unit and the gate are mounted; wherein the mold repositioning device comprises a guide rail, along which the traversing carriage is reciprocally moved along the predetermined path and a drive device for reciprocally moving the traversing carriage guided by the guide rail; wherein the filter mounting device performs placement of the upper and lower filters at the same indexed position; and wherein the indexed position, at which the slurry is supplied by the slurry supply device, and the indexed position, at which the compression is performed by the pressing machine, are defined on respective sides of the indexed position, at which the upper and lower filters are placed, with respect to direction of movement of the traversing carriage.

When the mold unit and the gate are mounted on the traversing carriage for movement together therewith, the gate can be used together with the mold unit even at any one of the indexed position, at which the filter placement takes place, and the indexed position at which the slurry is supplied into the mold unit and, therefore, the apparatus as a whole can be further simplified in structure. Also, since the path of movement of the traversing carriage is straight, the mold repositioning device may have a simplified structure.

In the case of the mold unit and the gate mounted on the traversing carriage as described above, the solid-liquid separating apparatus of the present invention may further include an indexing base mounted on the traversing carriage for movement in respective directions opposite to each other and parallel to a direction of reciprocal movement of the traversing carriage, and first and second stoppers disposed at respective opposite ends of the path of movement of the traversing carriage. In this case, the gate and a discharge chute, through which the compressed solid component is discharged from the second open end of the mold unit, are mounted on the index base in such a manner as to allow the gate and the discharge chute to be selectively aligned with the second open end of the mold unit by means of movement of the indexing base. The indexing base referred to above can be brought into engagement with the first stopper, as the traversing carriage moves towards a position adjacent the first stopper, but is moved to change respective positions of the gate and the discharge chute relative to the second open end of the mold unit by means of continued movement of the traversing carriage.

When the indexing base moving together with the traversing carriage is brought into engagement with the stoppers one at a time, opening and closure of the gate relative to the mold unit and change of the respective positions of the discharge chute and the gate relative to the mold unit can be accomplished. Because of this, no separate drive source for selectively opening and closing the gate and also for changing the respective positions of the discharge chute and the gate is needed and, therefore, the apparatus as a whole can be further simplified in structure.

The present invention in accordance with a further aspect thereof also provides a compressed solidified product manufactured by the solid-liquid separating method referred to hereinbefore. This compressed solidified product includes a cylindrical solid body, formed by compressing the slurry, and solid-liquid separating fiber filters sticking to opposite ends of the cylindrical solid body, respectively.

The compressed solidified product referred to above can also be manufactured with the use of the solid-liquid separating apparatus of the structure referred to hereinbefore. Accordingly, even though the solid component contained in the slurry consists of finely divided particles and/or particles difficult to entangle, an undesirable leakage of the solid component can be prevented. Also, the slurry filled in the mold unit of the solid-liquid separating apparatus can be compressed with a strong force to provide the compressed solidified product having a low content of the liquid component.

Even though the filters stick to the compressed solidified product, if material for each of the filters is properly selected, no problem associated with ingress of foreign material will arise and the compressed solidified product so formed with the filters sticking thereto can be reused as a material for steel making.

In the compressed solidified product referred to above, each of the filters may be in the form of a sheet. The sheet-like filters are easy to handle. Also, each of the filters is preferably a paper filter made of plant fibers. In the case where the filters are made of plant fibers, those filters will be burned out, when the compressed solidified product is charged into the steel making furnace and, therefore, the presence of the filters in the compressed solidified product does not affect the quality of a steel material eventually produced and, also, exhaust gases emitted from the filters when the latter are burned will not constitute a cause of environmental pollution.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
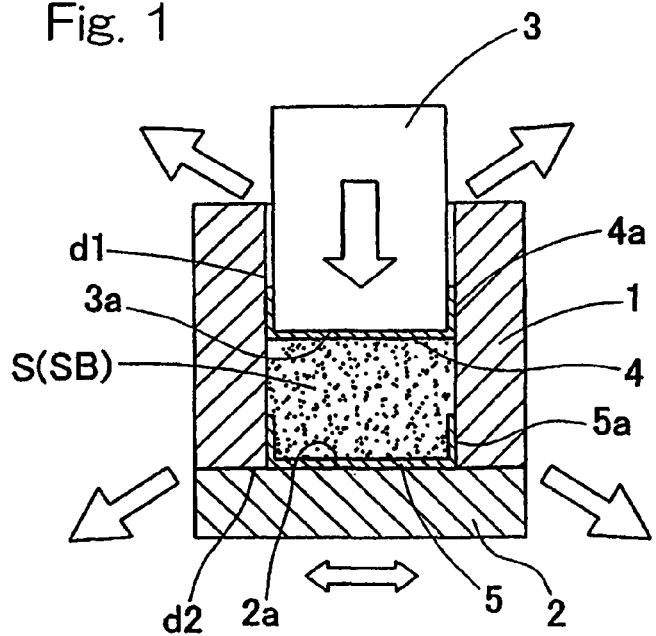
FIG. 1 is a schematic longitudinal sectional view showing an important portion of a solid-liquid separating apparatus capable of executing a solid-liquid separation of a slurry according to a first preferred embodiment of the present invention.

With particular reference to FIGS. 1 and 2, a solid-liquid separating apparatus capable of performing a solid-liquid separation of a slurry according to a first preferred embodiment of the present invention will be described in detail. The solid-liquid separating apparatus operable with the slurry shown in FIG. 1 includes a mold unit 1 having a cylindrical mold cavity, which forms an inner peripheral surface of the mold unit 1, defined therein and also having first and second open ends opposite to each other, a gate 2 for selectively opening and closing the second open end of the mold unit 1, and a pressing rod 3 slidably inserted within the cavity of the mold unit 1 for compressing a slurry S, charged into the cylindrical mold cavity, against the gate 2 when the latter is held in a closed position.

The solid-liquid separating apparatus is so designed and so structured that while fibrous solid-liquid separating filters 4 and 5 are so arranged in a leading end face 3a of the pressing rod 3 and an inner surface 2a of the gate 2 as to seal a gap d1 between an outer peripheral surface of a leading end of the pressing rod 3 and the inner peripheral surface of the mold unit 1 and a gap d2 between contact surfaces of the gate 2 and mold unit 1, respectively, the pressing rod 3 can be driven to compress the slurry S within the mold unit 1 and to subsequently push a resultant solid block out of the mold unit 1 together with the solid-liquid separating filters 4 and 5.

It is to be noted that the mold unit 1, the gate 2 and the pressing rod 3 may be of any suitable design capable of accommodating and utilizing the solid-liquid separating filters 4 and 5 in a manner described above and may not be specifically shaped and sized for the sake of those filters 4 and 5. It is also to be noted that the gap d1 is shown as exaggerated in FIG. 1, but is not greater than, for example, 0.1 mm.

Figure 11:
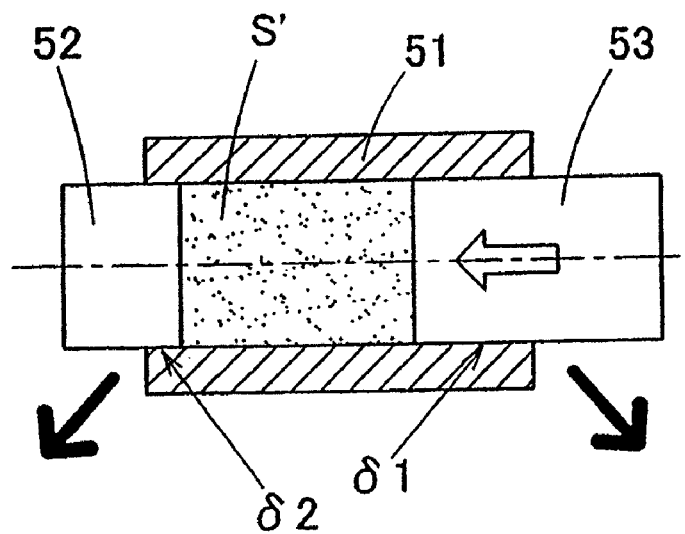
FIG. 11 is a schematic longitudinal sectional view of a relevant portion of the conventional solid-liquid separating apparatus.

The mold unit 1 may be either an upright type or a transverse or horizontally laid type, but the upright type is shown as employed in the illustrated embodiment and, hence, the first and second open ends of the mold unit 1 referred to above are hereinafter referred to as top and bottom open ends, respectively. The gate 2 is slidingly movable along a bottom face of the mold unit 1 in a direction conforming to a radial direction of the cylindrical mold cavity in the mold unit 1 between a closed position, where the gate 2 closes the bottom open end of the mold unit 1, and an open positions where the gate 2 is clear from the bottom open end of the mold unit 1. Alternatively, this gate 2 may be a plunger type, for example, such as shown by the gate 52 in FIG. 11, which is movable between the closed position, at which the gate is inserted into the mold unit 1, and the open position at which the gate is removed out of the mold unit 1.

The pressing rod 3 is selectively advanced and retracted by a press machine as will be described later. This pressing rod 3 is capable of undergoing a stroke of movement between a retracted position, at which the pressing rod 3 is retracted upwardly as viewed in FIG. 1 to allow the slurry S to be charged into the mold cavity in the mold unit 1, and an advanced position at which the pressing rod is advanced downwardly as viewed in FIG. 1 to push the solid block of the slurry S, which has been completely compressed within the mold cavity, out of the mold cavity. The press machine referred to above may include either a servo motor as a drive source or a hydraulic mechanism such as, for example, a hydraulic cylinder.

The slurry S to be treated with the solid-liquid separating apparatus of the preferred embodiment the present invention includes, for example, sludge produced during honing of steel materials, sludge produced during super-processing, sludge produced during lapping, sludge produced during grinding of rolling elements such as, for example, bearing rollers and steel balls or any other sludge produced during machining generally practiced in the art. The sludge produced during the honing has a particle size within the range of about 1 to about 50 μm while the sludge produced during the super-processing has a particle size in the order of submicron. Steel materials, which may be processed in any way to produce the sludge to be compressed with the solid-liquid separating apparatus of the present invention, may be of a kind which has been heat treated, for example, hardened. The slurry S to be compressed may be a slurry of food material such as, for example, bean curd refuse or red bean refuse, a pulp slurry or a dewatered sludge. Also, the slurry S to be compressed may contain solid particles of super hard steel or glass.

The upper and lower solid-liquid separating filters 4 and 5 are employed in the form of a sheet such as, for example, a paper filter or fabric filter. However, other than those filters, the upper and lower filters 4 and 5 may be employed in the form of a cotton sheet or a sponge sheet. Material for the upper and lower filters 4 and 5 may be chemical fibers, but plant fibers are preferred therefor. The solid-liquid separating filters 4 and 5 represent, for example, a round shape and preferably has a diameter greater than the diameter of the cylindrical mold cavity in the mold unit 1 so that when in use in a manner generally in FIG. 1, an outer peripheral portion of each of the solid-liquid separating filters 4 and 5, when placed inside the mold cavity, can be bent as to form respective protruding portions 4a and 5a along the inner peripheral surface of the mold cavity in a direction generally parallel to the direction of movement of the pressing rod 3. Each of the solid-liquid separating filters 4 and 5 has a roughness, which may be chosen in consideration of the slurry S to be treated. In particular, where the slurry S is a byproduct of the honing process applied to steel materials, each of the solid-liquid separating filters 4 and 5 has the quantity of airflow V ($cm^3/cm^2s$) that is so chosen as to be within the range of about 10 to about 300.

A method of solid-liquid separation performed by the use of the solid-liquid separating apparatus of the structure described above will now be discussed. Assuming that the bottom open end of the mold unit 1 is closed by the gate 2 then held at the closed position and the pressing rod 3 is held at the retracted position having been positioned above the top open end of the mold unit 1, the lower solid-liquid separating filter 5 is placed at the bottom of the mold cavity in the mold unit 1, followed by charging of the slurry S into the mold cavity from the top open end of the mold unit 1. After a predetermined quantity of the slurry S has filled up the mold cavity, the upper solid-liquid separating filter 4 is placed on the top level of the filled slurry S.

Thereafter, while the slurry S has been charged into the mold cavity in the mold unit 1 with the solid-liquid separating filters 4 and 5 placed inside the mold cavity in the manner described above, the pressing rod 3 is advanced within the mold cavity towards the advanced position to compress the slurry S. As the pressing rod 3 moves towards the advanced position with the slurry S being compressed, fluid components such as oil, water and any other processing liquids are squeezed out from the slurry S in a manner as will be described later, leaving a compressed solid block or briquette, which is subsequently ejected out of the mold cavity by the pressing rod 3 then arriving at the advanced position. As a matter of course, shortly before the arrival of the pressing rod 3 at the advanced position, but after the slurry S has been compressed, the gate 2 is opened to allow the compressed solid block to move out of the mold cavity through the lower open end of the mold unit 1.

The fluid components referred to above and squeezed out from the slurry S are purged to the outside of the mold unit 1 through the gap d1 between the peripheral surface of the mold cavity and the pressing rod 3 and the gap d2 between the gate 2 and the mold unit 1, as shown by respective arrows in FIG. 1. At this time, since those gaps d1 and d2 are substantially closed by the upper and lower filters 4 and 5, respectively, the fluid components squeezed out from the slurry S are purged to the outside of the mold unit 1 through the gaps d1 and d2 by way of those filters 4 and 5, not directly through those gaps d1 and d2 to the outside of the mold unit 1.

Because of the gaps d1 and d2 closed by the upper and lower filters 4 and 5 as described above, even though solid components of the slurry S are finely divided particles such as represented by scraps produced during the honing process or the super processing or scraps produced during the lapping process, they do in no way flow out of the mold unit through the gaps d1 and d2 between the mold unit 1 and the pressing rod 3 and between the mold unit 1 and the gate 2, respectively, and are effectively trapped by the upper and lower filters 4 and 5. Thus, the solid-liquid separating apparatus of the present invention can deal with, and achieve a solid-liquid separation of, even the slurry of a kind hitherto considered difficult to separate solid and liquid components from each other with the conventional ground sludge briquetting machine. Accordingly, not only can solidification of the slurry S by means of a compressing process be facilitated, but a processing liquid such as, for example, a liquid honing agent can be discharged in the form as substantially purified to such an extent that the discharged processing liquid need not be filtered at a subsequent stage of the process, thus allowing the processing liquid to be recovered for reuse.

Figure 2A:
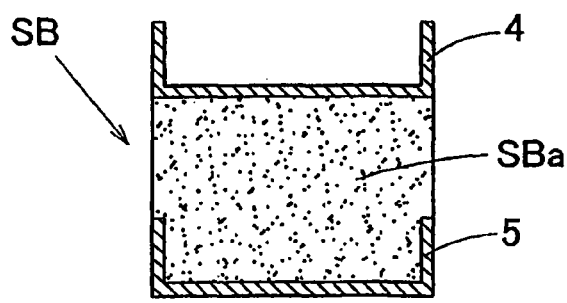
FIG. 2A is a schematic longitudinal sectional view showing a solid product of the slurry according to the present invention.
Figure 2B:
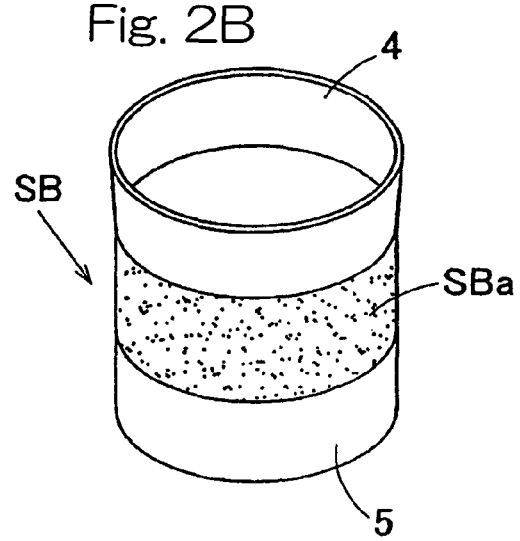
FIG. 2B is a schematic perspective view of the solid product of the slurry.

As discussed above, the slurry S within the mold cavity is, when squeezed in the manner described above, transformed into a compressed solidified product SB, shown in FIGS. 2A and 2B, in the form of a briquette, which represents a shape complemental to the shape of the mold cavity, that is, a cylindrical shape in the illustrated embodiment. The cylindrical compressed solidified product SB includes a cylindrical compressed solid mass SBa with the upper and lower filters 4 and 5 sticking to opposite ends of the compressed solid mass SBa as shown in FIGS. 2A and 2B.

Since in the illustrated embodiment the mold unit 1 having the cylindrical mold cavity and the pressing rod 3 are employed, a high degree of solid-liquid separation is possible by the utilization of a high pressure. Where the slurry S is a sludge produced during the honing process, the sludge as produced and, hence, at the time it is charged into the mold cavity, has an oil content of, for example, about 40 wt % relative to the total weight of the sludge, but can have an oil content not higher than 10 wt % after it has been squeezed with the apparatus and method according to the present invention.

When the slurry is transformed into the compressed solidified product SB in the manner described above, not only can the material handling, including transportation and storage, be facilitated, but also the resource recycling can be achieved. Where the slurry S contain a solid component in the form of divided steel particles or scraps, the resultant compressed solidified product SB can be used as a steel making material and can then be charged into a steel making furnace. Also, since with the apparatus and method of the present invention, a high degree solid-liquid separation can be accomplished to such an extent as to result in the compressed solidified product having, for example, an oil content of 10 wt % or lower, a processing liquid, which is a liquid component of the slurry, can be recovered highly efficiently. Accordingly, the resource can be economically utilized, lessening the load on the natural environment.

FIGS. 2A and 2B illustrates the compressed solidified product SB of a size, for example, 30 to 100 mm in both diameter and height. Each of the filters 4 and 5 represents, for example, a round shape of a diameter greater than that of the compressed solidified product SB. The protruding portions 4a and 5a of each of the filters 4 and 5, which protrudes outwardly from the limit bound by the cross-section of the compressed solidified product SB, may have any suitable shape, but in the illustrated embodiment, in which the filters 4 and 5 are used in association with the compressing of the slurry S to produce the compressed solid mass SBa, the lower filter 5 has its outwardly protruding portion 5a bent to assume an upright position following an outer periphery of the compressed solid mass SBa and the upper filter 4 has its outwardly protruding portion 4a either bent to assume an upright position extending from a top end face of the compressed solid mass SBa in a direction axially upwardly thereof, or crushed to assume any suitable shape.

It is to be noted that in the case where the slurry S is of a kind difficult to be solidified, such slurry S may not necessarily be solidified. Even though such slurry is not solidified, the liquid content is reduced as a result of the squeezing and, therefore, it can be used as a material for steel making. Also, even though such slurry is not solidified, a high degree of solid-liquid separation can be accomplished to such an extent as to result in an increase of the efficiency of recovery of, for example, a processing oil and, therefore, a substantially purified processing oil can be recovered. Thus, considering only the recovery of the processing oil, it is indeed economical.

The filters 4 and 5 are discharged out of the mold unit 1 by the pressing rod 3 together the compressed solidified product SB (i.e., either the compressed solid block or the non-compressed solid block) each time within the mold cavity and are replaced with new ones for the next succeeding cycle of operation of the solid-liquid separating apparatus. The filters 4 and 5 are used for each cycle of operation of the solid-liquid separating apparatus. Therefore, not only will any problem associated with clogging of the filters arise, but no complicated and time-consuming servicing and maintenance of the filter replacement is required. Also, since as hereinabove described the filters 4 and 5 are discharged together with the compressed solidified product each time the solid-liquid separating apparatus undergoes one cycle of operation, mere placement of new filters 4 and 5 within the mold cavity is sufficient with no complicated work such as a mounting work required, thus facilitating the placement of the new filters 4 and 5 in the mold unit 1.

The filters 4 and 5, when the compressed solidified product SB is ejected out of the mold unit 1, remain sticking to the compressed solidified product SB. However, if material for each of the filters 4 and 5 is properly selected, no problem associated with ingress of foreign material will arise and the compressed solidified product SB so formed with the filters 4 and 5 sticking thereto can be reused as a material for steel making. In the case where the filters 4 and 5 are made of plant fibers, the filters 4 and 5 will be burned out, when the compressed solidified product SB is charged into the steel making furnace. Therefore, the presence of the filters 4 and 5 does not affect the quality of a steel material eventually produced and, also, exhaust gases emitted from the filters 4 and 5 when the latter are burned will not constitute a cause of environmental pollution. Even though the filters 4 and 5 stick to the compressed solidified product SB, there is no need to do a work of separating the filters 4 and 5 from the compressed solidified product SB for disposal thereof, with the workability increased consequently.

Although the filters 4 and 5 are required to be replaced with new ones for each cycle of compressing operation, disposal of the used filters 4 and 5 would not pose any problem associated with cost and environmental pollution, if considered from the standpoint of an accomplishment of reusing solid components of the slurry which have been difficult to reuse, an increase of the rate of recovery of the liquid component and the alleviation of the necessity of filtering the processing liquid, both afforded by the apparatus and method of the present invention.

FIGS. 3 to 8 illustrate a specific example of the solid-liquid separating apparatus. The illustrated solid-liquid separating apparatus includes a mold repositioning device 11 for moving the mold unit 1 along a predetermined straight path between start and end positions past first to third indexed positions P1 to P3 as will be described in detail later, a filter mounting device 12 disposed at a location aligned with the second indexed position P2, a slurry supply device 13 disposed at a location aligned with the first indexed position P1, and a pressing machine 14 disposed at a location aligned with the third indexed position P3.

The mold repositioning device 11 includes guide rails 16 for guiding the mold unit 1 and the gate 2 mounted on a traversing unit 30 along the straight path and a drive unit 17 for moving the traversing unit 30 and, hence, the mold unit 1 between the start and end positions through the first to third indexed positions P1 and P3 as will be described later. The traversing unit 30 carries the mold unit 1, the gate 2 and the discharge chute 31 mounted on, or supported by a traversing carriage 15. The guide rails 16 are employed in the form of parallel bars supported at their opposite ends by axially spaced support walls of a stationary machine bench 41 so as to extend parallel to each other to thereby define the straight path.

Figure 3:
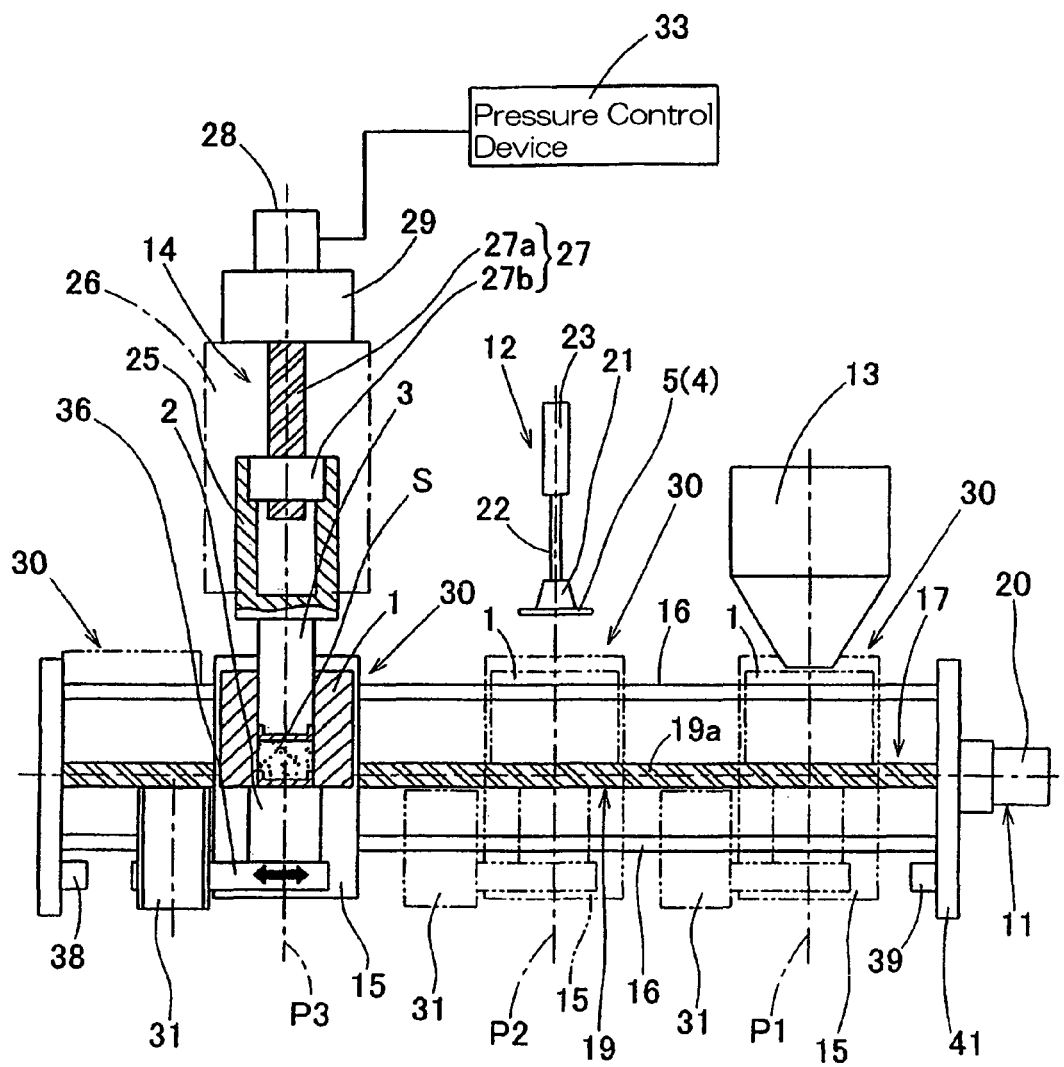
FIG. 3 is a front elevational view showing, with a portion broken away, an entirety of the solid-liquid separating apparatus.
Figure 7A:
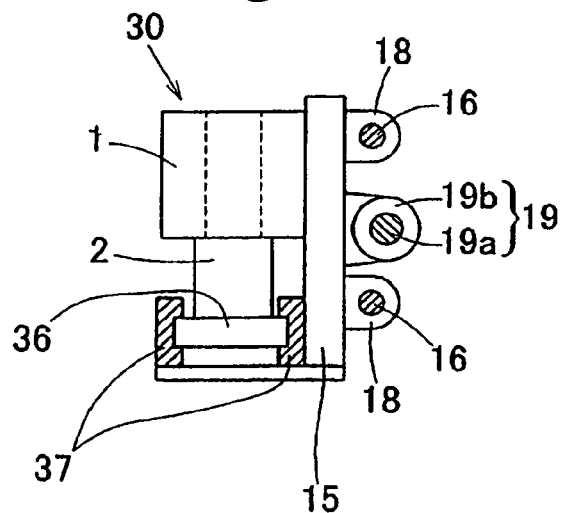
FIG. 7A is a side view showing, with a portion broken away, the operation of the traversing unit of the solid-liquid separating apparatus during the compressing process.
Figure 7B:
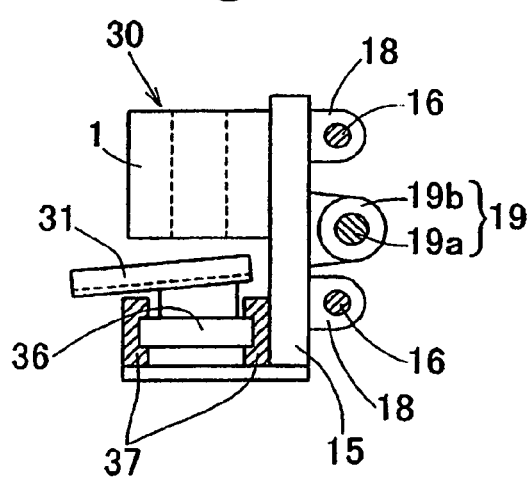
FIG. 7B is a view similar to FIG. 7A, showing the operation of the traversing unit of the solid-liquid separating apparatus during the discharge process.

The traversing unit 30 referred to above includes a traversing carriage 15 and an indexing base 36 lying substantially perpendicular to the traversing carriage 15 and mounted on a lower end portion of the traversing carriage 15 through a pair of generally U-sectioned guide members 37, shown in FIGS. 7A and 7B, for movement between left and right spaced positions as viewed in FIG. 3, which in effect correspond to the closed and open positions of the gate 2, respectively. The traversing carriage 15 referred to above is rigidly provided with guided elements 18, through which the traversing carriage 15 is slidably mounted on the guide rails 16 for movement along the straight path substantially as shown in FIGS. 7A and 7B.

The mold unit 1 is fixedly mounted on an upper end portion of the traversing carriage 15 and, on the other hand, the indexing base 36 is movably mounted on that lower end portion of the traversing carriage 15 through the guide members 37. The gate 2 referred to above is fixedly mounted on one of opposite ends, for example, a right end as viewed in FIG. 3, of the indexing base 36 and the discharge chute 31 is fixedly mounted on a left end portion of the indexing base 36 so as to extend completely through the thickness of the indexing base 36. Thus, it will readily be seen that while the gate 2 is held in the closed position closing the lower open end of the mold unit 1 as shown in FIG. 3, the discharge chute 31 is held in a standby position. However, when the traversing carriage 15 is moved to the right position corresponding to the open position of the gate 2, the discharge chute 31 can be brought into alignment with the lower open end of the mold unit 1, occupying the position which had been occupied by the gate 2.

The drive unit 17 includes a feed screw mechanism 19 such as, for example, a ball screw shaft extending parallel to the guide rails, and a drive motor 20 such as, for example, an AC servo motor for driving a screw shaft 19a of the feed screw mechanism 19 about the longitudinal axis of such screw shaft 19a. The screw shaft 19a of the feed screw mechanism 19 is rotatably supported by the axially spaced support walls of the stationary machine bench 41, and a ball nut 19b, which is drivingly mounted on the screw shaft 19, is rigidly connected to the traversing carriage 15 as shown in FIGS. 7A and 7B.

Referring to FIG. 3, of the first to third indexed positions P1 to P3, the second indexed position P2 is where the filters are placed inside the mold unit 1, with the first and third indexed positions P1 and P3 defined on right and left sides of this second indexed position P2. The first indexed position P1 is where the slurry is supplied into the mold cavity in the mold unit 1 and the third indexed position P3 is where the compressing of the slurry takes place successively. The traversing carriage 15 arriving at the third indexed position can be moved further past the third position P3 towards the end position defined on one side of the third indexed position P3 remote from the second indexed position P2, where the indexing base 36 is brought into engagement with a stopper 38, rigidly secured to the support wall of the machine bench 41, so that the discharge chute 31 can be moved rightwards together with the indexing base 36, accompanying a corresponding rightward movement of the gate 2, to occupy the position where the gate 2 had been held in the closed position. This traversing carriage 15 is, after the indexing base 36 has been engaged with the stopper 38, immediately moved backwards towards the third indexed position P3 so that the compressed solidified product SB can be subsequently ejected into the discharge chute 31 by the pressing rod 3 as will be described later.

The filter mounting device 12 disposed at the second indexed position P2 includes an elevating unit 23 such as, for example, a pneumatically operated cylinder for driving a lift rod 22 up and down in a direction perpendicular to the direction of movement of the traversing carriage 15, which rod 22 has a lower end provided with a suction pad 21 such as, for example, a vacuum chuck. This filter mounting device 12 is so designed and so operable as to place the lower filter 5 inside the mold unit 1 and also to place the upper filter 4 within the mold unit 1. It is to be noted that placement of the lower filter 5 may be carried out by placing the lower filter 5, held in a flat position, on a top surface of the mold unit 1 so that the lower filter 5 may be subsequently pushed by the pressing rod 3 deep into the mold cavity of the mold unit 2. It is also to be noted that the elevating unit 23 is supported for reciprocate movement between the second indexed position P2 and a position above a filter supply table (not shown) that is positioned in the vicinity of the second indexed position P2 and from which one of a stack of filters can be sucked and then placed inside the mold unit 1.

The slurry supply device 13 includes a hopper for accommodating the slurry S and supplying a predetermined quantity of the slurry S into the mold unit 1. This slurry supply device 13 may be in the form of a tube or the like.

The pressing machine 14 disposed at the third indexed position P3 is a mechanism for driving the pressing rod 3 up and down between the retracted and advanced positions and includes a lift body 25 having the pressing rod 3 secured thereto, or otherwise formed integrally therewith, so as to extend downwardly therefrom, which body 25 is mounted on a support block 26 for movement up and down. Thus, the pressing rod 3 can be moved up and down together with the lift body 25 by means of a servo motor 28 and a rotary-linear motion translating mechanism 27 for converting a rotary motion of the servo motor 28 into a linear motion assumed by the lift body 25 and, hence, the pressing rod 3.

The servo motor 28 is in the form of an AC servo motor, the rotation of which is transmitted to the rotary-linear motion translating mechanism 27 through a reduction gear unit 29. The rotary-linear motion translating mechanism 27 is in the form of, for example, a feed screw mechanism such as, for example, a ball screw and includes a nut 27b secured to the lift body 25 for movement together therewith and a screw shaft 27a threadingly extending through the nut 27b fast with the lift body 25 so that the latter can be moved along the screw shaft 27a as the latter is turned by the servo motor 28. The servo motor 28 referred to above is controlled by a pressure control device 33, with which the servo motor 28 is electrically connected.

As hereinbefore described, the traversing unit 30 is of the structure, in which the discharge chute 31, through which the compressed solidified product SB ejected out of the mold unit 1 through the lower open end thereof is discharged to the subsequent processing station, and the gate 2 are mounted on the indexing base 36, which is in turn mounted on the traversing carriage 15 through the guide members 37 for movement in a direction parallel to the direction of movement of the traversing carriage 15. The guide members 37 are not shown in the other figures than FIGS. 7A and 7B. The guide members 37 are of a structure robust enough to support the indexing base 36 so that the gate 2 can support a pressure developed during the compressing of the slurry S within the mold unit 1.

The indexing base 36 is, as hereinbefore described, movable between the left and right positions, which in effect correspond the closed and open positions of the gate 2, respectively. Hence, the movement of the indexing base 36 relative to the traversing carriage 15 between the left and right positions results in change of the respective positions of the discharge chute 31 and the gate 2 relative to the lower open end of the mold unit 1. Specifically, when the indexing base 36 is at the left position, the gate 2 is held in the closed position to close the lower open end of the mold unit 1 and the discharge chute 31 is held at the standby position clear from the mold unit 1, but when the indexing base 36 is at the right position, the gate 2 is held in the open position clear from the lower open end of the mold unit 1 and the discharge chute 31 is held at a position aligned and communicated with the lower open end of the mold unit 1.

Although not shown, the guide members 37 are provided with a releasable detent mechanism such as, for example, spring-biased ball plungers, which is operable to retain the indexing base 36 at the left and right positions, but to allow the indexing base 36 to move from the left position towards the right position, and vice versa, when an external force is applied to the indexing base 36. The use of the releasable detent mechanism is effective to avoid a misalignment of the gate 2 and the discharge chute 31 with the lower open end of the mold unit 1, which would otherwise occur as a result of vibrations, but this is not always essential in the practice of the present invention.

Figure 6A:
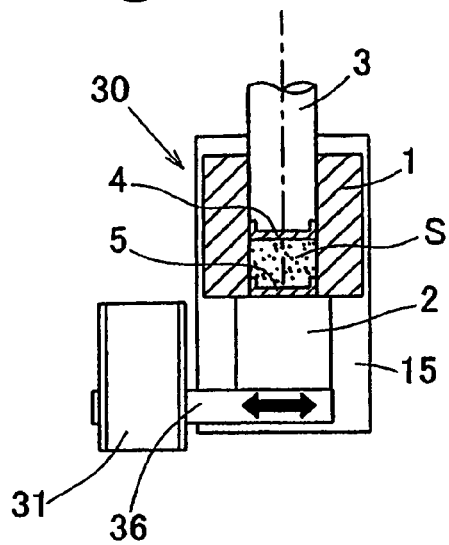
FIG. 6A is a front elevational view showing, with a portion broken away, the operation of a traversing unit of the solid-liquid separating apparatus during a compressing process.

The opposite support walls of the machine bench 41 has stoppers 38 and 39 rigidly secured at respective portions thereof, which are aligned with the path of movement of the indexing base 36, carried by the traversing carriage 15, so that when the traversing carriage 15 is moved to the start and end positions, the indexing base 36 can be brought into engagement with the stoppers 38 and 39, respectively. Accordingly, it will readily be understood that when the traversing carriage 15 with the indexing base 36 then held at the left position is driven leftwards, as viewed in FIG. 3, by the mold repositioning device 11, the indexing base 36 is brought into abutment with the stopper 38, but continued leftward movement of the traversing carriage 15 towards the end position past the third indexed position P3 can result in a rightward movement of the indexing base 36 towards the right position in contact with the stopper 38 relative to the traversing carriage 15 as best shown in FIG. 6A. Consequently, the gate 2 is held in the open position and the discharge chute 31 is held at a position aligned with the lower open end of the mold unit 1. Similarly, when the traversing carriage 15 with the indexing base 36 then held at the right position is driven rightwards, the indexing base 36 is brought into abutment with the stopper 39, but continued rightward movement of the traversing carriage 15 towards the start position past the first indexed position P1 can result in a leftward movement of the indexing base 36 towards the left position in contact with the stopper 39 relative to the traversing carriage 15 so that the gate 2 is held in the closed position to close the lower open end of the mold unit 1. In this way, the movement of the indexing base 36 relative to the traversing carriage 15 between the left and right positions results in change of the respective positions of the discharge chute 31 and the gate 2 relative to the lower open end of the mold unit 1.

The operation of the solid-liquid separating apparatus of the structure described above will now be described.

Figure 4:
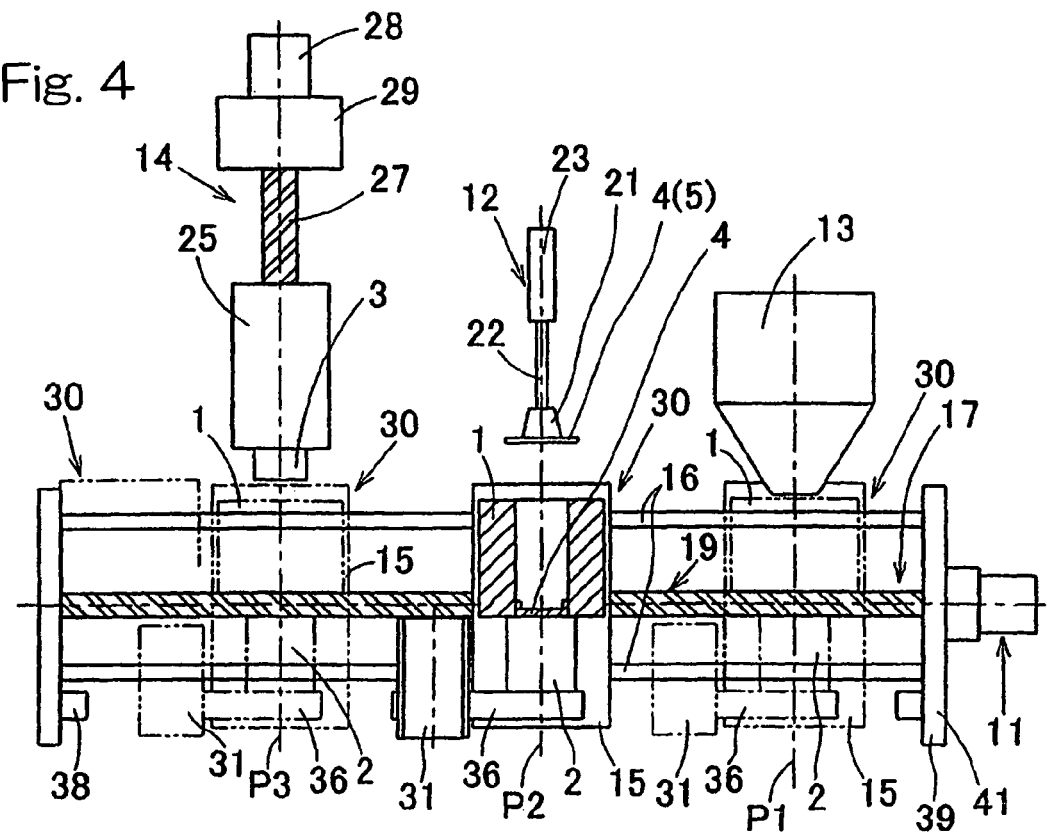
FIG. 4 is an explanatory diagram showing the sequence of operation of the solid-liquid separating apparatus.

At the outset, the traversing unit 30 is held at the second indexed position P2 as shown in FIG. 4, and the lower filter 5 is placed inside the mold unit 1 by means of the filter mounting device 12. At this time, the gate 2 is held at the closed position closing the lower open end of the mold unit 1 and, hence, the indexing base 36 is held at the left position.

Figure 5:
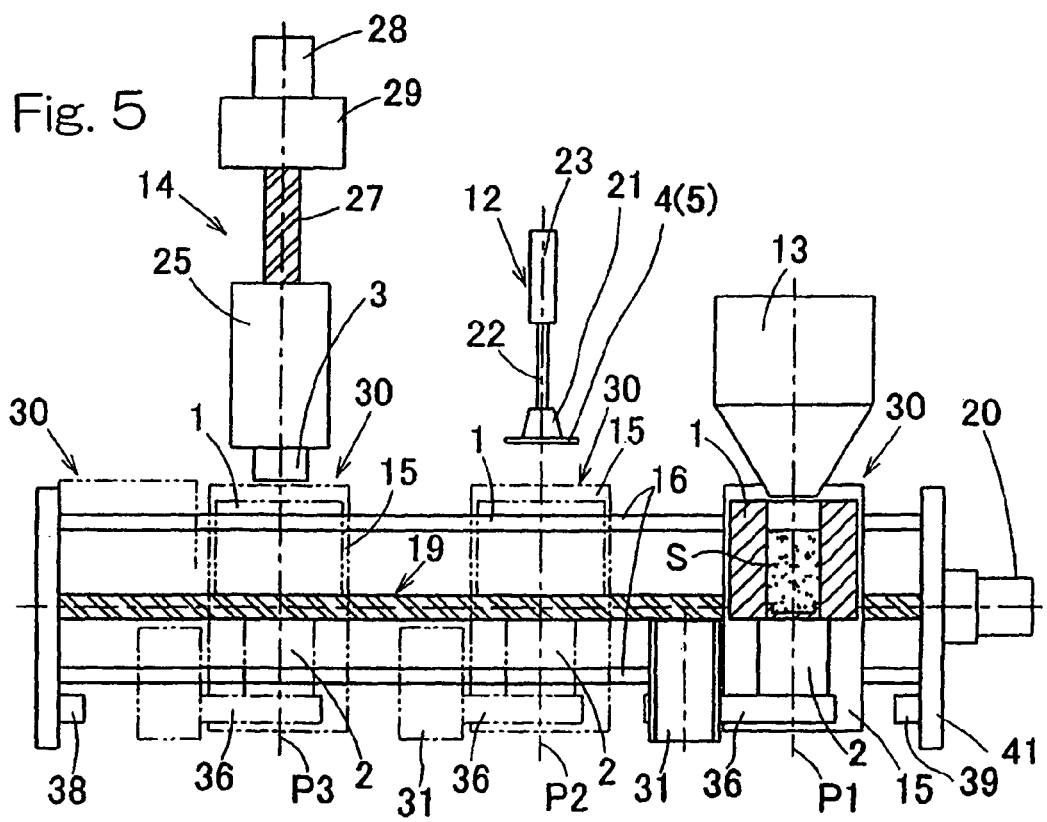
FIG. 5 is an explanatory diagram showing the different sequence of operation of the solid-liquid separating apparatus.

After the lower filter 5 has been placed inside the mold unit 1 in the manner as hereinbefore described, during the condition as shown in FIG. 4, the traversing unit 30 is moved to the first indexed position P1, as shown in FIG. 5, at which a predetermined amount of the slurry S is charged into the mold unit 1 through the slurry supply device 13. Upon completion of the charging of the slurry S into the mold unit 1, the traversing unit 30 is again moved back to the second indexed position P2, followed by the placement of the upper filter 4 into the mold unit 1 through the filter mounting device 12.

After the successive placement of the lower and upper filters 5 and 4, the traversing unit 30 carrying the mold unit 1 filled with the slurry S is moved to the third indexed position P3 as shown in FIG. 3, at which the pressing rod 3 is lowered by the pressing machine 14 towards the advanced position, at which the pressing rod 3 extends into the mold unit 1 to compress the slurry S within the mold unit 1. As hereinbefore described, as the slurry S is so compressed, solid-liquid separation of the slurry S takes place, with fluid components thereof purged from the mold unit 1 and, on the other hand, a compressed solidified product SB remaining within the mold unit 1.

Thereafter and specifically after the pressing rod 3 once advanced has been retracted back to the retracted position, the traversing unit 30 is further moved leftwards towards the end position. Shortly before the arrival of the traversing unit 30 at the end position, the indexing base 36 is brought into engagement with the stopper 38 and, during the continued leftward movement of the traversing unit 30 towards the end position, the indexing base 36 is moved rightwards from the left position towards the right position in contact with the stopper 38. Simultaneously or substantially simultaneously with the arrival of the traversing unit 30 at the end position, the indexing base 36 so moved rightwards assumes the right position, at which the gate 2 is moved to the opened position and, on the other hand, the discharge chute 31 is brought into alignment with the lower open end of the mold unit 1 as shown in FIG. 6B.

Figure 6B:
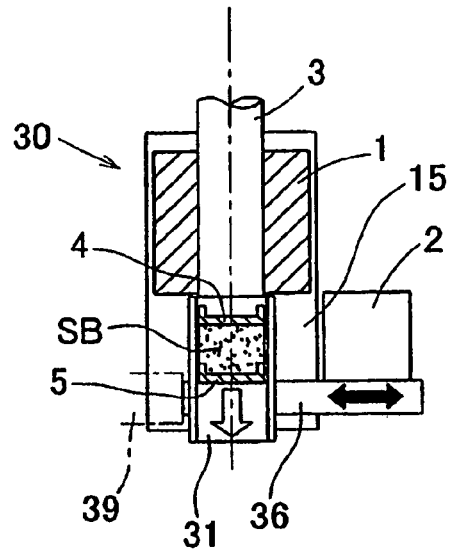
FIG. 6B is a view similar to FIG. 6A, showing the operation of the traversing unit of the solid-liquid separating apparatus during a discharge process.

Starting from this condition substantially as shown in FIG. 6B, the traversing unit 30 is moved back from the end position to the third indexed position P3 and the pressing rod 3 is again advanced towards the advanced position to urge the compressed solidified product SB to fall into the discharge chute 31, with the compressed solidified product SB consequently discharged to the subsequent processing station through the discharge chute 31.

After the discharge of the compressed solidified product SB, the traversing unit 30 is moved rightwards past the second and first indexed positions P2 and P1 to the start position. However, shortly before the arrival of the traversing unit 30 at the start position, the indexing base 36 is brought into engagement with the stopper 39 and, during the continued rightward movement of the traversing unit 30 towards the start position, the indexing base 36 is moved leftwards from the right position towards the left position in contact with the stopper 39. Simultaneously or substantially simultaneously with the arrival of the traversing unit 30 at the start position, the indexing base 36 so moved leftwards assumes the left position, at which the gate 2 is moved to the closed position and, on the other hand, the discharge chute 31 is to a position clear from the lower open end of the mold unit 1 as shown in FIG. 6A. The traversing unit 30 is subsequently returned to the initial, second indexed position P2 without stopping at the first indexed position P1 in readiness for the next succeeding cycle of operation of the solid-liquid separating apparatus.

As hereinbefore described, the solid-liquid separating apparatus in accordance with the preferred embodiment of the present invention is provided with the traversing unit 30 carrying the mold unit 1 for movement together therewith through the first to third indexed positions P1 to P3. Therefore, despite the use of a process step of placing the upper and lower filters 4 and 5, the respective devices capable of performing a process step of successively placing the upper and lower filters 4 and 5, a process step of supplying the slurry S into the mold unit 1, a process step of compressing the slurry S and a process step of ejecting the compressed solidified product SB through the discharge chute 31 can advantageously be simplified. Also, since the arrangement has been made to move the mold unit, the filter mounting device 12 can be operated to suck the new filters 4 and 5 from the filter supply table (not shown) in advance of the actual placement of those filters 4 and 5 one at a time during the compressing of the slurry S taking place and also during the supply of the slurry S into the mold unit, and, therefore, a process from the filter placement to the product discharge by way of the slurry compression can be efficiently performed, resulting in increase of the productivity.

It is to be noted that although in the foregoing embodiment reference has been made to the use of only one filter mounting device 12 for the successive placement of the lower and upper filters 5 and 4, the present invention is not always limited thereto and the use may be made of two separate filter mounting devices for placing the upper and lower filters 4 and 5, respectively. In such case, the number of the indexed positions, at which the traversing unit 30 may be positioned by the mold repositioning device 11, may be increased so that the two filter mounting devices may be disposed at different indexed positions.

Hereinafter, the operation to control the pressure utilized to accomplish the solid-liquid separation will be described with particular reference to FIGS. 8 and 9. The pressure control device 33 shown in FIG. 3 is operable to perform a pressure control so that the pressure applied to the pressing rod 3 can be within a predetermined range and is coordinated with speed and torque controls of the servo motor 28 to perform such pressure control in a manner best shown in the chart of FIG. 8.

The pressure control operation referred to above includes a quick advance mode S(1), a press advance mode S(2), a press retention mode S(3) and a quick retraction mode S(4). During the press advance mode S(2), a torque feedback control and a speed feedback control are performed and, during the press retention mode S(3), only the torque feedback control is performed. The details of the pressure control operation will be set forth in the following description.

Figure 9:
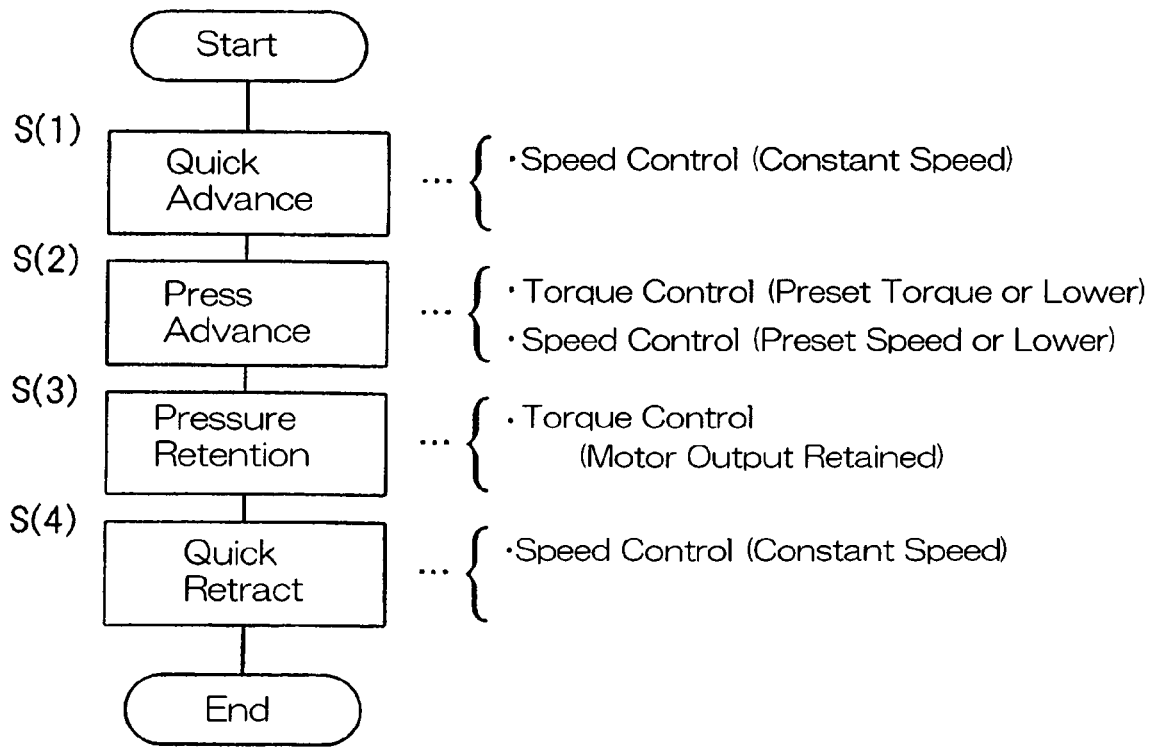
FIG. 9 is a flowchart showing the control of the pressing operation.

As best shown in FIG. 9, the quick advance mode S(1) is a period during which the pressing rod 3 is advanced with its lower end approaching the slurry S within the mold unit 1 and, hence, a speed control takes place to keep a predetermined speed or the like. This speed control may be performed in any manner.

The press advance mode S(2) is a period during which the solid-liquid separation based on the squeezing is carried out and, hence, a pressure control is performed by means of a torque control, performed to avoid a load torque from exceeding a preset value, so that the pressure acting on the slurry S can be kept at a value equal to or lower than a predetermined pressure. Along with the torque control, a speed control is also performed to avoid the speed from exceeding the preset speed. During this press advance mode S(2), the motor output torque increases as the solid-liquid separation proceeds, but the advance is interrupted when the preset load torque is attained.

The press retention mode S(3) is a period during which the torque control is performed so that the motor output at the time of the preset load torque can be retained for a preset length of time.

The quick retraction mode S(4) is a period during which the pressing rod 3 is removed out of the mold unit and, hence, the control to maintain the speed at the predetermined value is performed.

It is to be noted that the torque control referred to above may be such that the torque feedback control is performed with the use of a torque detector (not shown) or, instead of the torque value being detected directly, detection of a load current flowing through the servo motor 28 may be made and, on the other hand, with respect to the torque control, it may be an open loop so that the torque control can be accomplished through an electric current feedback.

Since the conventional ground sludge briquetting machine is of a hydraulically operated type, the speed control of the hydraulic cylinder, which is a drive source for the pressing rod is generally controlled by means of a flow control valve. Because of this, with this hydraulic system, a proper control can hardly be accomplished in unison with the progress of the solid-liquid separation.

Figure 8:
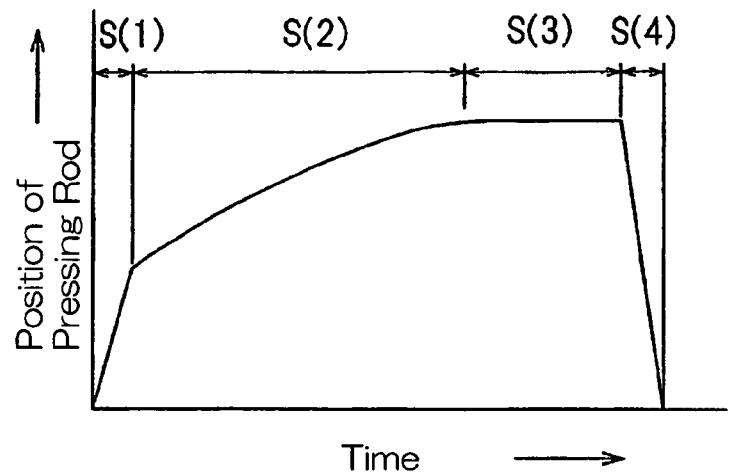
FIG. 8 is a diagram showing a control of a pressing operation of the solid-liquid separating apparatus.

However, with the drive system relying on the servo motor 28 and the rotary-linear motion translating mechanism 27 such as employed in the foregoing embodiment, the control is easy to achieve and, if the control is performed in the manner shown in FIG. 8, the solid-liquid separation can be optimally controlled to achieve an efficient solid-liquid separation.

With respect to the detection of the starting point of time of the solid-liquid separation, by switching from the quick advance mode S(1) to the press advance mode S(2) through the detection of an abrupt increase of the load torque, the amount of a quick advance movement appropriate to the amount of the slurry S charged can be attained, thus, minimizing the waste of time.

Also, the following optimum solid-liquid separation can be realized. In other words, shortly after the start of the press advance mode S(2), the speed and torque of the servo motor 28, shown in FIG. 3 is, prior to the start of the solid-liquid separation, so controlled that the pressure sufficient to avoid a breakage of the filters 4 and 5 caused by the internal pressure, generated by the slurry S filled in the mold unit 1, can be attained. As the solid-liquid separation proceeds, the speed and torque of the servo motor 28 are gradually increased to such an extent as to result in such an output torque that the final press retention pressure can be attained. By those sequences, the optimum solid-liquid separation can be performed and the solid-liquid separation can be completed in a short length of time as compared with the hydraulic system of speed control.

The use of the servo motor 28 brings about the following advantages.

(1) Energy saving: Energy saving of about 80% relative to the hydraulic fixed displacement pump system and about 40% as compared with a variable displacement pump system can be obtained.

(2) Easy maintenance: No maintenance work such as, for example, replacement of an operating fluid for the hydraulic system and replacement of filters in the hydraulic fluid circuit is needed.

(3) Low noise level: The working conditions improves.

(4) Efficient solid-liquid separation: With the torque control of the servo motor 28, the optimum solid-liquid separation takes place.

Figure 10:
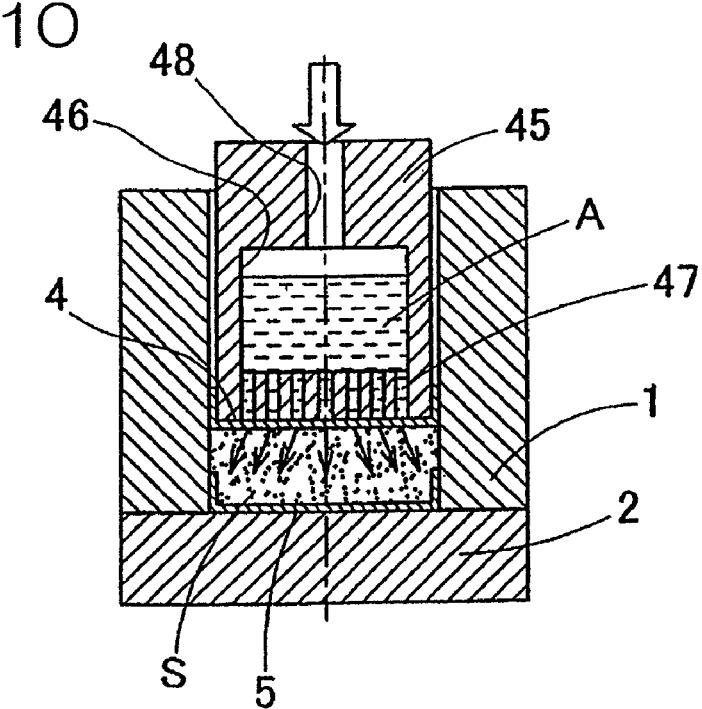
FIG. 10 is a fragmentary longitudinal sectional view of a portion of the solid-liquid separating apparatus according to a second preferred embodiment of the present invention, showing the relation between a nozzle head, which forms means for injecting a liquid bonding agent, and a mold unit.

FIG. 10 is a fragmentary longitudinal sectional view of a portion of the solid-liquid separating apparatus according to another preferred embodiment of the present invention, showing the relation between a nozzle head, which forms means for injecting a liquid bonding agent, and the mold unit 1. The solid-liquid separating apparatus according to the embodiment shown in FIG. 10 is substantially similar to that described hereinbefore in connection with the first embodiment, but is additionally provided with means for and a process step of injecting a bonding agent or a hardening agent.

As is well known to those skilled in the art, it often occurs that depending on the material constituting the slurry S, the slurry S would not be solidified merely by means of the compressing process. If such a slurry S is desired to be solidified, injection of the bonding agent A or the hardening agent into the compressed solid body within the mold unit 1, which has already been compressed in the mold unit 1, is preferably carried out to thereby solidify the compressed solid body. It is to be noted that the term "hardening agent" referred to above and hereinafter is intended as encompassing a coagulating agent. For the bonding agent A, examples include an epoxy resin system and a water-soluble urethane foam. It is also to be noted that since such injection must be performed to allow the bonding agent A or the hardening agent to penetrate into the compressed solid body through the filter 4, the bonding agent A or the hardening agent that can be used in the practice of the present invention has to be of a kind permeable through the filter 4.

So far as shown in FIG. 10, the bonding agent A or the hardening agent is injected into the compressed solid body with an injection nozzle head 45 inserted into the mold unit 1. This injection nozzle head 45 is in the form of a tubular rod having an outer diameter sufficient to allow it to be substantially inserted into the mold unit 1 and has a reservoir chamber 46 defined therein for accommodating a quantity of the bonding agent A or the hardening agent and a multiplicity of nozzle perforations 47 defined in a leading end face 45*a* of the nozzle head 45, which is brought into contact with the compressed solid body within the mold unit 1, in communication with the reservoir chamber 46. The injection nozzle head 45 also includes a compressed gas supply passage 48 defined in a trailing end thereof opposite to the leading end face 45*a* for supplying a compressed gas required to urge from above the bonding agent A or the hardening agent within the reservoir chamber 46 to flow outwardly through the nozzle perforations 47.

The nozzle head 45 of the structure described above is disposed at an additional indexed position for injection defined, for example, generally intermediate between the third indexed position P3 for compressing, as shown in FIG. 4, and an indexed position P4 (not shown) for discharge of the compressed solidified product.

According to the second embodiment of the present invention described above, after the slurry S has been compressed within the mold unit 1 by means of the press machine 14 in the manner described hereinbefore, the pressing rod 3 is retracted out of the mold unit 1 and the injection nozzle head 45, shown in FIG. 10, is inserted into the mold unit 1 at the additional indexed position for injection to thereby inject the bonding agent A or the hardening agent.

Where the bonding agent A or the hardening agent is injected into the mold unit 1 after the slurry S within the mold unit 1 has been compressed, unlike the case in which the bonding agent or the hardening agent is injected at a stage before the slurry is compressed, the liquid components squeezed out from the slurry S as a result of the compression does not mix in the bonding agent or the hardening agent and, therefore, the liquid components as squeezed out from the slurry can be recovered. Also, since after the slurry S within the mold unit 1 has been compressed, the bonding agent A or the hardening agent is injected into the mold unit 1 then accommodating therein the compressed solid body, there is no need to discharge from the mold unit 1, the compressed solid body in a condition insufficiently solidified, resulting in increase of the workability.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A solid-liquid separating method for separating a slurry into a solid component and a liquid component, which is accomplished by utilization of a solid-liquid separating apparatus comprising a mold unit having a cylindrical mold cavity defined therein for accommodating the slurry and also having first and second open ends opposite to each other, a gate for selectively opening and closing the second open end of the mold unit and a pressing rod slidable into the cavity of the mold unit to urge the slurry against the gate, then held in position to close the second open end of the mold unit, to thereby compress the slurry, which method comprises:

placing fibrous solid-liquid separating filters, each of which is a round sheet, in the mold unit so as to seal a gap, delimited between an inner peripheral surface of the mold unit and an outer periphery of a leading end of the pressing rod, and another gap delimited between respective contact surfaces of the gate and the mold unit, respectively;

driving the pressing rod into the mold cavity to compress the slurry within the mold unit; and ejecting a resultant solid component, in a form of a cylindrical solidified block body with opposite ends thereof having respective fibrous solid-liquid separating filters, having respective protruding portions protruding axially along the inner peripheral surface of the mold unit so as to form a cylindrical surface, stuck thereon, out of the mold unit.

2. The solid-liquid separating method as claimed in claim 1, wherein the solid component of the slurry contains metallic particles as a principal component thereof.

3. The solid-liquid separating method as claimed in claim 1, wherein the solid component of the slurry has liquid component content not higher than 10 wt % after being compressed.

* * * * *